(12) United States Patent
Wakabayashi et al.

(10) Patent No.: US 7,859,980 B2
(45) Date of Patent: Dec. 28, 2010

(54) OPTICAL PICKUP DEVICE AND INFORMATION PROCESSOR

(75) Inventors: Kanji Wakabayashi, Kyoto (JP); Yoshiaki Komma, Osaka (JP); Kousei Sano, Osaka (JP); Hidenori Wada, Kyoto (JP); Keiichi Matsuzaki, Osaka (JP); Toshiyasu Tanaka, Osaka (JP)

(73) Assignee: Panasonic Corporation, Osaka (JP)

( * ) Notice: Subject to any disclaimer, the term of this patent is extended or adjusted under 35 U.S.C. 154(b) by 317 days.

(21) Appl. No.: 12/280,037

(22) PCT Filed: Feb. 15, 2007

(86) PCT No.: PCT/JP2007/052681

§ 371 (c)(1),
(2), (4) Date: Aug. 20, 2008

(87) PCT Pub. No.: WO2007/097239

PCT Pub. Date: Aug. 30, 2007

(65) Prior Publication Data

US 2010/0165823 A1    Jul. 1, 2010

(30) Foreign Application Priority Data

Feb. 22, 2006    (JP) .............................. 2006-044689

(51) Int. Cl.
*G11B 7/135* (2006.01)
(52) U.S. Cl. .................................. 369/116; 369/112.22
(58) Field of Classification Search ............. 369/112.22
See application file for complete search history.

(56) References Cited

U.S. PATENT DOCUMENTS 5,467,336 A * 11/1995 Ando et al. .............. 369/13.29
5,469,423 A * 11/1995 Shinoda et al. ......... 369/112.16
5,563,870 A * 10/1996 Silverstein ............. 369/112.01
5,615,200 A *  3/1997 Hoshino et al. ........ 369/112.04

(Continued)

FOREIGN PATENT DOCUMENTS

JP    62-78741    4/1987

(Continued)

OTHER PUBLICATIONS

International Search Report issued Mar. 13, 2007 in the International (PCT) Application of which the present application is the U.S. National Stage.

(Continued)

*Primary Examiner*—Peter Vincent Agustin
(74) *Attorney, Agent, or Firm*—Wenderoth, Lind & Ponack, L.L.P.

(57) ABSTRACT

In an optical beam transmissive adjusting mechanism (110) included in an optical pickup device, arrangement positions of a first transmissive element (111) having a first transmittance and a second transmissive element (112) having a second transmittance higher than the first transmittance are switched by a rotational drive unit (105), and an optical beam having a first optical power and an optical beam having a second optical power are output selectively. Furthermore, since a transmissive element of a non-transmissive side for an optical beam is arranged at an angle inclined to an optical axis of the optical beam, the transmissive element does not obstruct a path of the optical beam to be diffused.

9 Claims, 13 Drawing Sheets

U.S. PATENT DOCUMENTS

| | | | |
|---|---|---|---|
| 5,974,011 A | 10/1999 | Nakane | |
| 6,788,637 B1 * | 9/2004 | Dang et al. | 369/112.23 |
| 7,092,346 B2 * | 8/2006 | Yamamoto | 369/116 |
| 2010/0165823 A1 * | 7/2010 | Wakabayashi et al. | 369/116 |

FOREIGN PATENT DOCUMENTS

| | | |
|---|---|---|
| JP | 6-290485 | 10/1994 |
| JP | 2000-195086 | 7/2000 |
| JP | 2002-150601 | 5/2002 |
| JP | 2003-22574 | 1/2003 |
| JP | 2003-257072 | 9/2003 |
| JP | 2005-174455 | 6/2005 |
| JP | 2006-040432 | 2/2006 |

OTHER PUBLICATIONS

Patent Cooperation Treaty (PCT) International Preliminary Report on Patentability (in English language), issued in International Application No. PCT/JP2007/052681, mailed Mar. 13, 2007.

* cited by examiner (a)

(b)

(a)

(b)

OPTICAL PICKUP DEVICE AND INFORMATION PROCESSOR

TECHNICAL FIELD

The present invention relates to an optical pickup device and an information processing apparatus comprising the optical pickup device. More specifically, the present invention relates to an optical pickup device which radiates a short-wavelength semiconductor laser light such as a blue light emitting semiconductor laser using a GaN-based semiconductor and an information processing apparatus.

BACKGROUND ART

On a digital versatile disk (DVD), digital data can be recorded at a recording density which is about six times that of a compact disk (CD). The DVD is known as an information recording medium, i.e., a so-called optical disk on which large-volume digital data such as movie data or music data can be written.

In recent years, since the amount of information of information to be recorded increases, an information recording medium having a larger capacity is desired.

In order to increase the capacity of the information recording medium of the optical disk, the information recording density must be increased. In general, this can be, in a data write or read state, realized by decreasing a spot diameter of a laser beam radiated on the optical disk. In order to decrease the spot diameter of the beam, the wavelength of the laser beam may be further shortened, and the numerical aperture (NA) of an objective lens may be increased. For a DVD, a light source having a wavelength of 660 nm and an objective lens having an NA of 0.6 are used. Furthermore, for example, by using a blue laser beam having a wavelength of 405 nm and an objective lens having an NA of 0.85, information can be recorded at a recording density which is five times that of a current DVD.

In addition to shorten the wavelength of the laser beam by using the blue laser or the like, a technique of forming a plurality of recording layers in one optical disk is in development, in order to further increase the recording density. For example, if an optical disk having two recording layers can be obtained, in addition to the shortening of the wavelength of the laser beam and use of an objective length having a large NA, the recording density is about ten times that of the DVD having one recording layer.

However, in an optical disk apparatus having a blue laser as a light source, the margin of an optical power for reproduction in the blue laser is very small, quantum noise of the optical source poses a problem.

For example, in a conventional optical disk apparatus described in Japanese Unexamined Patent Publication No. 2000-195086, an optical pickup device in which an intensity filter serving as optical beam transmissive adjusting means is installed such that the optical beam transmissive adjusting means can be almost vertically inserted into and removed from a path of a laser beam is disclosed. In this optical disk apparatus, the intensity filter is inserted into the path of the laser beam during reproduction and is removed from a path of an emitted beam during recording. In this manner, for example, quantum noise of the semiconductor laser can be kept low, and high-quality reproduction can be performed.

However, in the optical disk apparatus, the intensity filter is arranged such that the intensity filter can be vertically and linearly removed from or inserted into the path of the laser beam. For this reason, a space to move the intensity filter is necessary. As a result, the optical pickup device disadvantageously increases in size.

In order to solve the problem, it may be possible to use another optical pickup device in which an intensity filter moving on an optical path by rotation is arranged in place of the intensity filter linearly moving on an optical axis. Referring to FIGS. 11 to 13, the optical pickup device will be described below.

FIG. 11 shows a configuration of a conventional optical pickup device. When a GaN-based blue-color light-emitting semiconductor laser beam source 41 radiates a blue optical beam, the optical beam enters to an optical beam transmissive adjusting means 200. The optical beam transmissive adjusting means 200 is pivoted to a predetermined position depending on a data read state from an optical disk 50 or a data write state on the optical disk 50, and the position of the intensity filter is adjusted. The optical beam transmitted through the optical beam transmissive adjusting means 200 is reflected by a beam splitter 42, collimated by a collimator lens 43, reflected by a mirror 44, and focused on the optical disk 50 through an objective lens 45.

In the data read state, the focused optical beam is reflected by a recording layer of the optical disk 50, reaches the beam splitter 42 through a reverse path, passes through the beam splitter 42, and then enters to a photodiode 48 through a multi-lens 47. The photodiode 48 is a so-called photodetector. The photodiode 48 outputs an electric signal on the basis of the position and the intensity of the incident beam. On the basis of the electric signal, data is reproduced.

On the other hand, in the data write state, an optical spot is formed on an information layer by the focused optical beam. As a result, a state of a recording layer at a portion where the optical spot is formed, e.g., a crystal state changes depending on data to be written. In this manner, in the optical disk 50, data is written as a change of states of the recording layers.

FIG. 12(a) is a perspective view obtained when the optical beam passes through the optical filter of the optical beam transmissive adjusting means 200 and corresponds to an arrangement in the data read state. The optical beam transmissive adjusting means 200 has a transmissive element 201. The transmissive element 201 has a pair of first parallel planes including two planes parallel to each other and a pair of second parallel planes including two planes parallel to each other. On at least one plane of the pair of first parallel planes, an optical filter 201a which attenuates optical power of the transmitting optical beam through the transmissive element 201 is applied. The optical beam transmissive adjusting means 200 includes a support member 104 which supports the transmissive element 201 and a rotational drive unit 105 which rotationally drives the transmissive element 201 about a rotating shaft 103. The support member 104 supports the rotating shaft 103 rotatably such that the transmissive element 201 can be rotated about the rotating shaft 103 which is parallel to the four planes constituting the pair of first parallel planes and the pair of second parallel planes of the transmissive element 201. The rotational drive unit 105 rotationally drives the transmissive element 201 about the rotating shaft 103.

FIG. 12(b) is a perspective view obtained when the optical beam do not transmit through the optical filter 201a of the optical beam transmissive adjusting means 200 and corresponds to an arrangement in the data write state. The optical beam transmissive adjusting means 200 can switch a position where the optical beam passes through the pair of first parallel planes of the transmissive element 201 and a position where the optical beam passes through the pair of second parallel planes through rotational drive about the rotating shaft 103. In this manner, the case in which the optical beam passes through the optical filter 201a and the case in which the optical beam does not pass through the optical filter 201a can be switched to each other. When the optical beam passes through the optical filter 201a, optical power can be suppressed to a low level in comparison with the case in which the optical beam does not pass through the optical filter 201a.

DISCLOSURE OF THE INVENTION

Problem to be Solved by the Invention

However, according to the configuration in which the transmissive element 201 of the optical beam transmissive adjusting means 200 is rotated, miniaturization can be realized, whereas there arises another problem in which component accuracy and assembling accuracy must be improved to reduce an angle difference in a mounting state and an operation state.

More specifically, the transmissive element 201 is an integrated element having a transmission surface having the optical filter 201a and transmission surfaces having no optical filter 201a. The transmission surfaces are switched by rotation to adjust optical power. Therefore, when the optical beam passes through the transmission surface having the optical filter 201a, a transmission distance of the optical beam is equal to the length L of the surface having no optical filter 201a. On the other hand, when the optical beam passes through the transmission surfaces having no optical filter 201a, a transmission distance of the optical beam is equal to the length L of the surface having the optical filter 201a.

When the surface of the transmissive element 201 is not vertical to an optical axis, i.e., when an entry angle is misaligned, the optical beam is deflected on the surface of the transmissive element 201. For this reason, an optical axis in an incident state of the optical beam with respect to the transmissive element 201 is misaligned from an optical axis in an outgoing state. FIG. 13(a) shows a state in which an entry angle of an optical beam with respect to the transmissive element 201 of the optical beam transmissive adjusting means 200 is not misaligned. On the other hand, FIG. 13(b) shows a misaligned state of an optical axis when an entry angle of an optical beam with respect to the transmissive element 201 is misaligned. According to FIG. 13(a), the transmission distance of the optical beam is equal to the length L of one side of the transmission surface. Therefore, as shown in FIG. 13(b), when entry angle misalignment h of the optical beam occurs, the transmission distance increases in proportion to the length L of one side of the transmission surface. Therefore, optical axis misalignment D occurs.

The length L of one side of the transmission surface of the transmissive element 201 must be equal to or longer than a certain length, i.e., an effective diameter of the optical beam in order to secure a length required to reliably transmit the optical beam. More specifically, the transmission distance depends on the certain length. As described above, in a case that the transmission distance becomes longer, the misalignment D of the optical axis occurring after transmittance by refraction when the entry angle misalignment of the optical beam occurs increases in proportion to the transmission distance. For this reason, improvement of component accuracy and assembling accuracy as well as reduction in angle misalignment must be achieved.

The optical beam transmissive adjusting means, as shown in FIG. 11, is arranged in a region in which the optical beam radiated from the semiconductor laser beam source 41 is diffused. Even in this situation, a condition that the transmissive element must transmit the optical beam without a loss of the optical beam is also required It is an object of the present invention to provide an optical pickup device and an information processing apparatus which do not cut off a path of a transmitted beam while suppressing misalignment of an optical axis caused by an optical beam transmissive adjusting means for adjusting optical power of an optical beam emitted from a light source.

Means for Solving the Problems

An optical pickup device according to a first aspect of the present invention, there is provided an optical pickup device comprising: a light source configured to emit an optical beam having a predetermined optical power; an optical beam transmissive adjusting mechanism configured to adjust a transmission quantity of the optical beam; and a light-gathering member configured to focus the optical beam passing through the optical beam transmissive adjusting mechanism on an information recording medium, the optical beam transmissive adjusting mechanism including: a first transmissive element having a first transmittance; a second transmissive element having a second transmittance higher than the first transmittance; a support member configured to rotatably support the first transmissive element and the second transmissive element about a rotating shaft parallel to the first transmissive element and the second transmissive element; and a rotational drive unit configured to rotationally drive the first transmissive element and the second transmissive element about the rotating shaft, the rotational drive unit being driven to switch a first position where the optical beam passes through the first transmissive element and a second position where the optical beam passes through the second transmissive element, so that an optical beam having a first optical power smaller than the predetermined optical power and an optical beam having a second optical power larger than the first optical power and not more than the predetermined optical power being output selectively, wherein, when the optical beam passes through one of the first transmissive element and the second transmissive element, the other of the first transmissive element and the second transmissive element is arranged at an angle inclined to an optical axis of the optical beam.

The angle may be an angle corresponding to diffusion of the optical beam passing through the one of the transmissive elements.

One of the first transmissive element and the second transmissive element through which the optical beam passes may be inclined with respect to the optical axis of the optical beam.

The angle may be an anti-adhesive angle which prevents dust from adhering to the other transmissive element.

The angle between the one transmissive element and the other transmissive element may be an angle smaller than 90°.

A transmission distance at which the optical beam passes through the first transmissive element may be shorter than a length of each of sides constituting a surface of the second transmissive element, and a transmission distance at which the optical beam passes through the second transmissive element may be shorter than a length of each of sides constituting a surface of the first transmissive element.

A transmission distance at which the optical beam passes through the first transmissive element or the second transmissive element may be shorter than a length of a side constituting a plane of incidence of one of the transmissive elements.

The light source may be a semiconductor laser which emits a beam in a wavelength region from green to ultraviolet.

The light source may be a semiconductor laser which emits a beam in a blue wavelength region.

An information processing apparatus according to a second aspect of the present invention includes the optical pickup device according to the first aspect further having a photodetector configured to detect a reflected light from the information recording medium and a signal processing circuit configured to generate at least one of a reproduced signal and a servo signal on the basis of the detected reflected light.

The information processing apparatus can load information recording media of a plurality of types having different numbers of recording layers, and radiates optical beams having magnitudes of optical power depending on the numbers of recording layers to the loaded information recording media to read and/or write data. When an information recording medium having one recording layer is loaded, the information processing apparatus may switch the position to the first position by rotationally driving the rotational drive unit to radiate an optical beam having the first optical power to the recording layer. When an information recording medium having a plurality of recording layers is loaded, the information processing apparatus may switch the position to the second position by rotationally driving the rotational driving unit to radiate an optical beam having the second optical power to one of the recording layers.

Effect of the Invention

According to the optical pickup device of the first aspect and the information processing apparatus of the second aspect, the optical beam transmissive adjusting mechanism which rotationally drives two transmissive elements different from each other in transmittance to switch optical power of the optical beam is included. Since the thicknesses of the transmissive elements of the optical beam transmissive adjusting mechanism are not limited to an effective diameter of the optical beam, even though component accuracy and assembling accuracy are the same as those in a conventional technique, misalignment of an optical axis caused by refraction after transmittance when an entry angle of the optical beam is misaligned in the optical beam transmissive adjusting mechanism can be suppressed to a low level. Improvement of apparatus reliability, reduction in production costs, and the like can also be realized.

Furthermore, according to the optical pickup device, in addition to the above effects, when the optical beam passes through one of the first transmissive element and the second transmissive element, the other of the first transmissive element and the second transmissive element is arranged at an angle inclined with respect to the optical axis. For this reason, a path of the optical beam passing through one optical element and being diffused is not obstructed by the other transmissive element.

DESCRIPTION OF REFERENCE NUMERALS

Figure 1:
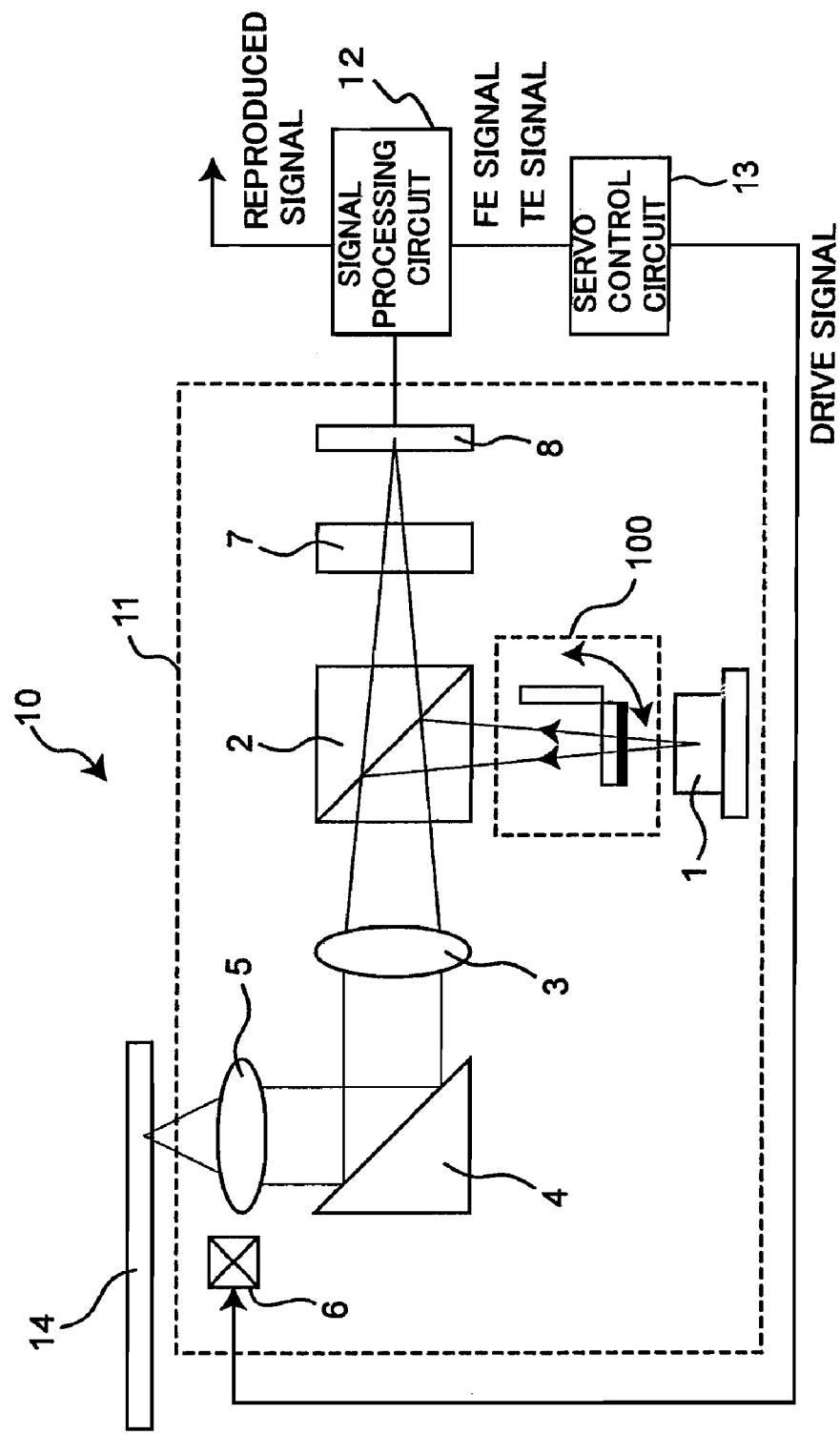
FIG. 1 is a diagram showing a configuration of functional blocks of an optical disk apparatus including an optical pickup device according to a first embodiment of the present invention.

1 . . . optical source, 2 . . . beam splitter, 3 . . . collimator lens, 4 . . . mirror, 5 . . . objective lens, 6 . . . actuator coil, 7 . . . multi-lens, 8 . . . photodiode, 10 . . . optical disk apparatus, 11 . . . optical pickup device, 12 . . . signal processing circuit, 13 . . . servo control circuit, 14 . . . optical disk, 100 . . . optical beam transmissive adjusting mechanism, 101 . . . first transmissive element, 101a . . . optical filter, 102 . . . second transmissive element, 103 . . . rotating shaft, 104 . . . support member, 105 . . . rotational drive unit, 111 . . . transmissive element, 112 . . . transmissive element.

BEST MODE FOR CARRYING OUT THE INVENTION

An optical pickup device according to an embodiment of the present invention and an information processing apparatus including the optical pickup device will be described below with reference to the drawings. The same reference numerals as in the drawings denote the same parts or similar parts in the drawings.

First Embodiment

FIG. 1 shows a configuration of functional blocks of an optical disk apparatus 10 serving as an example of the information processing apparatus according to the present embodiment. The optical disk apparatus 10 includes an optical pickup device 11, a signal processing circuit 12, and a servo control circuit 13. FIG. 1 shows an optical disk 14 for descriptive convenience. However, the optical disk 14 is not a constituent element of the optical disk apparatus 10.

An outline of an operation of the optical disk apparatus 10 will be described below. The optical pickup device 11 radiates an optical beam to the optical disk 14, detects a reflected light from the optical disk 14, and outputs a light quantity signal depending on a detected position and a detected light quantity of the reflected light. The signal processing circuit 12 generates and outputs a focus error (FE) signal representing a focused state of the optical beam on the optical disk 14, a tracking error (TE) signal representing a positional relationship between a focal position of the optical beam and a track of the optical disk 14, or the like, according to the light quantity signal outputted from the optical pickup device 11. The FE signal and the TE signal are generally referred to as servo signals. The servo control circuit 13 generates and outputs a drive signal on the basis of these signals. The drive signal is inputted to an actuator coil 6 of the optical pickup device 11 to be described later to adjust a position of an objective lens 5. In this manner, the focal point of the optical beam radiated on the optical disk 14 is controlled so as not to go off a recording layer.

In the state where the focal point of the optical beam is controlled so as not to go off the recording layer, the signal processing circuit 12 outputs a reproduced signal on the basis of the light quantity signal. The reproduced signal represents data written in the optical disk 14. In this manner, reading of data from the optical disk 14 is realized. An optical power of the optical beam is larger than an optical power in the reproduction state to make it possible for the optical pickup device 11 to write data on the optical disk 14.

A configuration of the optical pickup device 11 will be described below. One of main characteristics of the optical pickup device 11 according to the present embodiment is that an optical beam transmissive adjusting mechanism 100 is constituted by two transmissive elements different from each other in transmittance. The optical beam transmissive adjusting mechanism 100 can adjust the optical power of the optical beam by switching the transmissive elements by rotational drive.

The optical pickup device 11, as shown in FIG. 1, includes a light source 1, the optical beam transmissive adjusting mechanism 100, a beam splitter 2, a collimator lens 3, a mirror 4, an objective lens 5, an actuator coil 6, a multi-lens 7, and a photodiode 8.

The light source 1 is a GaN-based semiconductor laser which emits blue light. The light source 1 radiates coherent light to read and write data to the recording layer of the optical disk 14.

The optical beam transmissive adjusting mechanism 100 is an optical element which changes the transmittance to change optical power in a state where quantum noise of the optical beam radiated by the light source 1 is kept low. In this case, referring to FIGS. 2A and 2B, a detailed configuration of the optical beam transmissive adjusting mechanism 100 will be described below.

Figure 2A:
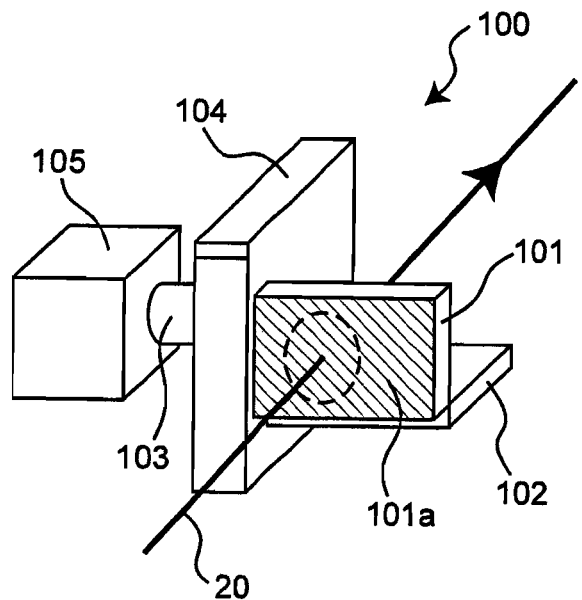
FIG. 2A is a perspective view obtained when an optical beam passes through an optical filter of an optical beam transmissive adjusting mechanism in the optical pickup device shown in FIG. 1.
Figure 2B:
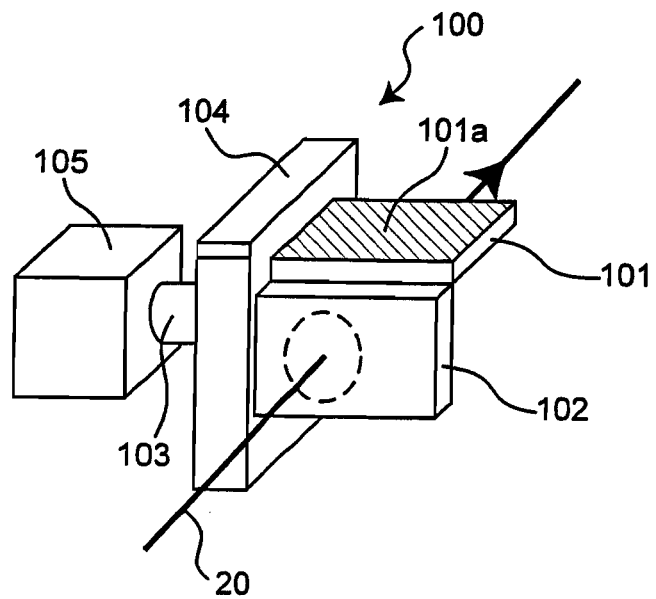
FIG. 2B is a perspective view obtained when the optical beam does not pass through the optical filter of the optical beam transmissive adjusting mechanism in the optical pickup device shown in FIG. 1.

FIG. 2A is a perspective view obtained when an optical beam 20 radiated from the light source 1 passes through an optical filter of the optical beam transmissive adjusting mechanism 100, and FIG. 2B is a perspective view obtained when the optical beam 20 does not pass through the optical filter of the optical beam transmissive adjusting mechanism 100. The optical beam 20 progresses in a direction indicated by the arrow.

The optical beam transmissive adjusting mechanism 100 has a first transmissive element 101, a second transmissive element 102, a rotating shaft 103, a support member 104, and a rotational drive unit 105. An optical filter 101a having a transmittance of 50% is applied to the first transmissive element 101. The optical filter 101a attenuates optical power of the optical beam 20 passing through the first transmissive element 101. On the other hand, the optical filter 101a is not applied to the second transmissive element 102, and the second transmissive element 102 transmits the optical beam 20 in a state where the optical power of the optical beam 20 is almost maintained. The support member 104 rotatably supports the first transmissive element 101 and the second transmissive element 102 in a circumferential direction of the rotating shaft 103. The rotating shaft 103 is parallel to the first transmissive element 101 and the second transmissive element 102. The rotational drive unit 105 rotationally drives the first transmissive element 101 and the second transmissive element 102 in the circumferential direction of the rotating shaft 103.

The optical beam transmissive adjusting mechanism 100 rotationally drives the rotating shaft 103 in the circumferential direction of the rotating shaft 103 by using the rotational drive unit 105 and then makes it possible to switch between a state in which the optical beam 20 passes through the first transmissive element 101 as shown in FIG. 2A and a state in which the optical beam 20 passes through the second transmissive element 102 as shown in FIG. 2B. More specifically, the optical beam transmissive adjusting mechanism 100 can switch whether or not the optical beam 20 passes through the optical filter 101a. The optical power of the optical beam 20 when the optical beam 20 passes through the optical filter 101a is 50% of the optical power obtained when the optical beam 20 does not pass through the optical filter 101a.

FIG. 1 is referred to again. The beam splitter 2 separates optical beams radiated by the light source 1. The collimator lens 3 converts the optical beam radiated by the light source 1 into parallel light. The mirror 4 reflects an optical beam to be reached thereon and directs the reflected optical beam to the optical disk 14. The objective lens 5 concentrates the optical beam on the recording layer of the optical disk 14. The actuator coil 6 changes the position of the objective lens 6 in a direction vertical to the optical disk 14 or/and a direction parallel to the optical disk 14 depending on a level of a drive signal applied to the actuator coil 6. The multi-lens 7 focuses the optical beam on the photodiode 8. The photodiode 8 receives the optical beam reflected by the recording layer of the optical disk 14 and converts the optical beam into an electric signal (light quantity signal) depending on light quantity of the optical beam. The photodiode 8 may include a plurality of light-receiving elements. The signal processing circuit 12 receiving the light quantity signal generates the FE signal and the TE signal while also using information that represents which light-receiving element outputting the light quantity signal.

Next, an operation performed when the optical disk apparatus 10 reads and writes data will be described. As a precondition, when the optical disk 14 has two recording layers, transmittance of a recording layer near the objective lens 5 is set at about 50%. For this reason, the magnitude of optical power required to record or reproduce data for the optical disk having the two recording layers is about twice that of optical power required for an optical disk having one recording layer. The optical pickup device 11 according to the present embodiment will be described on the assumption that the optical pickup device 11 has a function of switching optical power depending on the number of the recording layer, i.e. one or two, of the optical disk 14.

First, the light source 1 emits the optical beam 20 having predetermined optical power. At this time, it is assumed that the optical beam transmissive adjusting mechanism 100 is arranged so that the optical beam passes through the optical filter 101*a*. The optical beam emitted from the optical beam transmissive adjusting mechanism 100 is reflected by the beam splitter 2, collimated by the collimator lens 3, and reflected by the mirror 4. Thereafter, the objective lens 5 focuses the optical beam on the recording layer of the optical disk 14. The reflected light from the recording layer passes through the inside of the optical pickup device 11 and enters to the photodiode 8. The signal processing circuit 12 determines the number of the recording layers included in the optical disk 14 on the basis of the signal amplitude of the light quantity signal. Various determining processes maybe used. For example, determination information for specifying the number of recording layers may be recorded on an inner circumference portion of the optical disk 14 in the manufacturing process, and the determination information may be read as a reproduced signal to specify the number of layers. Alternatively, since the intensities of reflected lights are different on the basis of the types of recording media when a laser beam is applied, the intensities of the reflected lights may be detected to determine the number of layers in the signal processing circuit 12. Alternatively, when the optical disk 14 is loaded while being stored in a cartridge, the number of layers maybe determined depending on the shape of the cartridge that varies depending on the type of the optical disk 14. In either case, the number of the recording layers can be detected using the optical characteristic and/or physical characteristic of the loaded optical disk.

When the optical disk 14 is determined to have one recording layer, the optical beam transmissive adjusting mechanism 100 rotates the first transmissive element 101 and the second transmissive element 102 to set the first transmissive element 101 at a position where the first transmissive element 101 is vertical to the optical axis of the optical beam 20 and to set the second transmissive element 102 at a position where the second transmissive element 102 is out of the optical path of the optical beam 20. The optical filter 101*a* attenuates the optical power of the optical beam 20 entered thereto to 50% and then transmits the optical beam 20 therethrough.

On the other hand, when the optical disk 14 is determined to have two recording layers, the optical beam transmissive adjusting mechanism 100 rotates the first transmissive element 101 and the second transmissive element 102 to set the second transmissive element 102 at a position where the second transmissive element 102 is vertical to the optical axis of the optical beam 20 and to set the first transmissive element 101 at a position where the first transmissive element 101 is out of the optical path of the optical beam 20. As a result, the second transmissive element 102 transmits the optical beam without substantially attenuating the optical power of the optical beam.

In a data write state, a state of the recording layer at a portion where an optical spot is formed changes depending on the contents of the data. On the other hand, in a data read state, the optical beam is reflected at a reflectance corresponding to the state of the recording layer of the optical disk 14. The optical beam reflected by the recording layer passes through the objective lens 5 again, is reflected by the mirror 4, passes through the collimator lens 3, and is focused on the photodiode 8 through the multi-lens 7. As a result, the photodiode 8 generates and outputs the light quantity signal. The signal processing circuit 12 generates a reproduced signal representing the contents of the written data in the optical disk, the focus error signal, the tracking error signal, and the like on the basis of the light quantity signal.

According to the optical beam transmissive adjusting mechanism 100 of the present embodiment, even though the optical axis of the optical beam is not vertical to the surface of incidence of the optical beam transmissive adjusting mechanism 100, i.e., an entry angle misalignment occurs, misalignment between an optical axis of the incident light and an optical axis of the outgoing light can be suppressed to a low level. The reason will be described below with reference to FIGS. 3A and 3B.

Figure 3A:
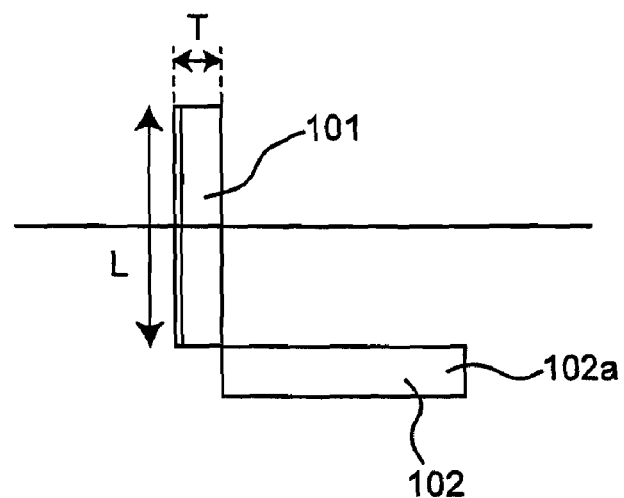
FIG. 3A is a diagram showing a state in which an entry angle of the optical beam to a first transmissive element of the optical beam transmissive adjusting mechanism is not misaligned in the optical pickup device shown in FIG. 1.
Figure 3B:
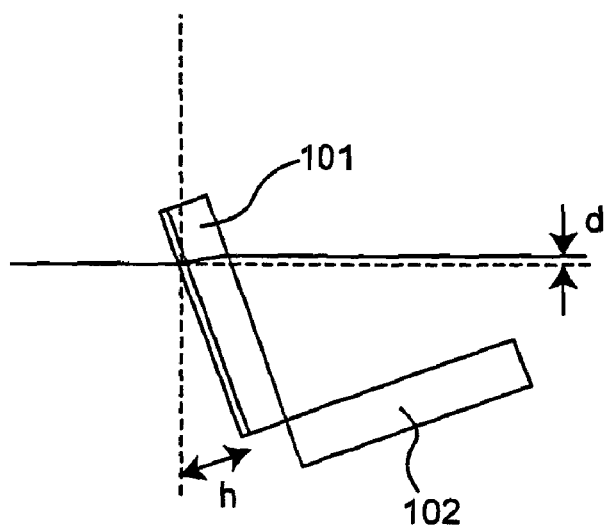
FIG. 3B is a diagram showing a state in which entry angle misalignment h of the optical beam to the first transmissive element of the optical beam transmissive adjusting mechanism is present in the optical pickup device shown in FIG. 1.

FIG. 3A shows a state in which the entry angle misalignment of the optical beam 20 with respect to the first transmissive element 101 of the optical beam transmissive adjusting mechanism 100 is not present. A transmission distance at which the optical beam 20 passes through the first transmissive element 101 is equal to a thickness T of the first transmissive element 101. The distance is independent of a length L of one side of the transmission surface of the first transmissive element 101. On the other hand, FIG. 3B shows a state of misalignment of the optical axis of the optical beam 20 when an entry angle misalignment h of the optical beam 20 with respect to the first transmissive element 101 exists. When the entry angle misalignment h of the optical beam 20 is present, an optical axis misalignment d is produced in proportion to the thickness T of the transmissive element. The transmission distance of the optical beam at this time is equal to or larger than the thickness T. However, the transmission distance is sufficiently smaller than the length L of one side of the transmission surface of the first transmissive element 101.

In the optical beam transmissive adjusting mechanism 100 according to the present embodiment, since the transmissive element 101 and the transmissive element 102 different from each other in transmittance are formed separately each other, the length L of one side of the transmission surface of each of the transmissive elements 101 and 102 and the thickness T of each of the transmissive elements 101 and 102 can be independently set. More specifically, only the length L of the transmission surface is limited to an effective diameter of the optical beam 20, and the thicknesses T of the transmissive elements 101 and 102 can be decreased without being limited to the effective diameter of the optical beam 20. This has an advantage of considerably reducing misalignment of an optical axis in comparison with the conventional optical beam transmissive adjusting means like a construction in which the transmissive element 101 and the transmissive element 102 are integrally formed.

As described above, according to the optical disk apparatus 10 of the present embodiment, the optical beam transmissive adjusting mechanism can reduce the thickness of the transmissive element. Therefore, misalignment of the optical axis after passing through the transmissive element, which is caused by the refraction when the entry angle of the optical beam is misaligned, can be reduced. As a result, improvement of apparatus reliability, reduction in production costs, and the like can be achieved.

In the present embodiment, the transmissive element 101 to which the optical filter 101a is applied and the transmissive element 102 to which the optical filter 101a is not applied are switched to switch optical power of the optical beam 20. However, two transmissive elements with different in transmittance may be switched to switch optical power of the optical beam. The number of transmissive elements which are different in transmittance and which are switched is not limited to two. Three or more transmissive elements may be used. In this manner, the optical power can be switched to multi-stages depending on the number of transmissive elements.

In the present embodiment, the optical beam is obtained by the semiconductor laser which emits the blue light. However, semiconductor lasers which emit beams in a wavelength region from green to ultraviolet may be used.

In the present embodiment, the optical beam transmissive adjusting mechanism 100 switches the optical power of the optical beam 20 in accordance with a state in which the information recording medium has one recording layer and a state in which the information recording medium has two recording layers. In an optical disk apparatus which can write and/or read data in/from an information recording medium having a large number of recording layers, the optical power of the optical beam may be switched depending on the number of recording layers of the optical disk. In the present embodiment, the optical beam transmissive adjusting mechanism 100 switches the optical power of the optical beam on the basis of the state in which the information recording medium has one recording layer and the state in which the information recording medium has two recording layers. However, the optical power of the optical beam may be switched in accordance with reading and writing states of the data.

The collimator lens 3 and the objective lens 5 of the optical disk apparatus 10 are examples of a light-gathering means or a light-gathering member. The signal processing circuit 12 and the servo control circuit 13 in the optical disk apparatus 10 can be formed as an optical disk controller that can be arranged separately from the optical pickup device 11 in the form of one circuit or chip. Alternatively, the signal processing circuit 12 and the servo control circuit 13 may be arranged within the optical pickup device 11. In this case, the signal processing circuit 12 and the servo control circuit 13 serve as constituent elements of an optical head.

The optical disk 14 is an example of the information recording medium. Furthermore, a card from/on which data can be optically read and written may also be used.

Second Embodiment

An optical pickup device according to a second embodiment including a modified structure of the optical beam transmissive adjusting mechanism 100 in the above embodiment will be described below.

Figure 4:
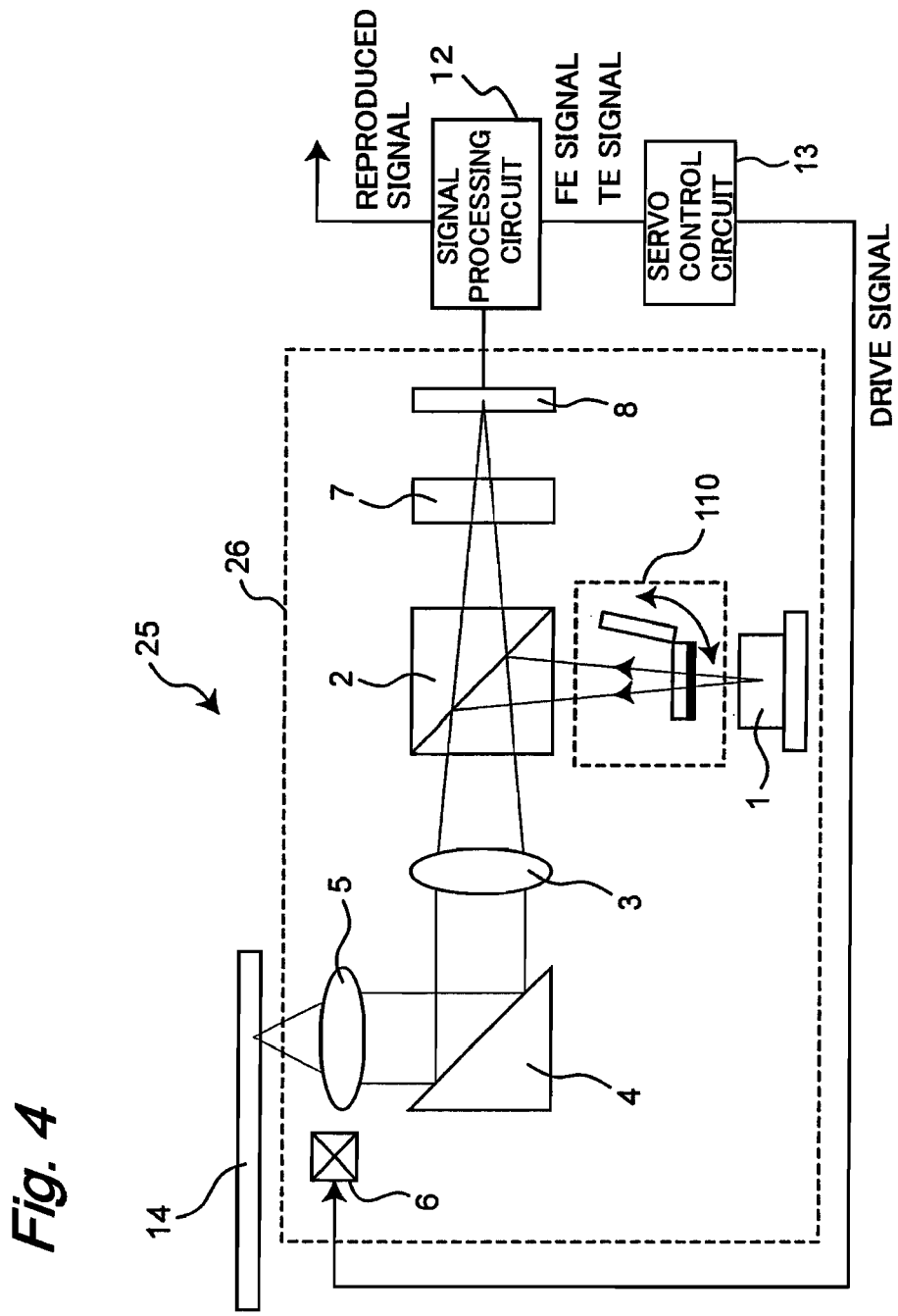
FIG. 4 is a diagram showing a configuration of functional blocks of an optical disk apparatus including an optical pickup device according to a second embodiment of the present invention.
Figure 5A:
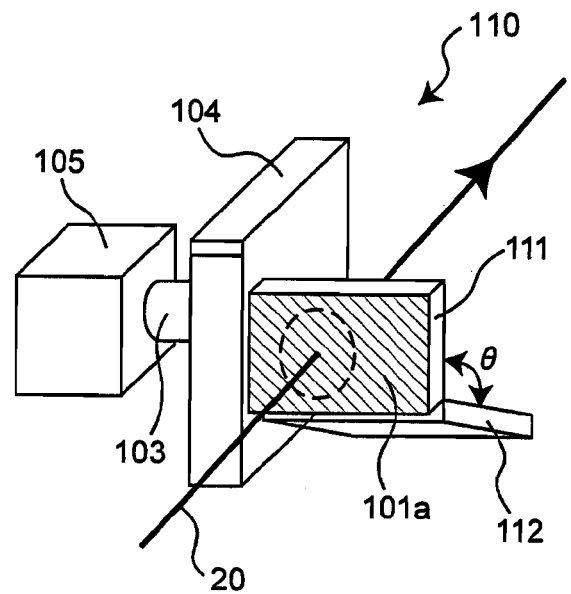
FIG. 5A is a perspective view obtained when an optical beam passes through an optical filter of an optical beam transmissive adjusting mechanism in the optical pickup device shown in FIG. 4.
Figure 5B:
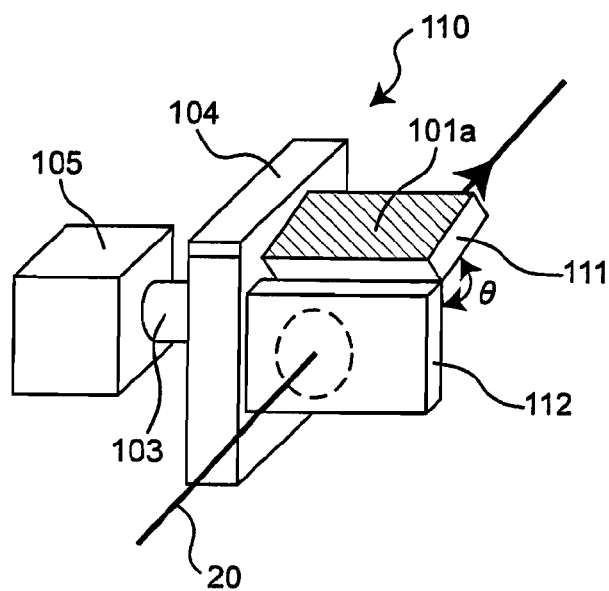
FIG. 5B is a perspective view obtained when the optical beam does not pass through the optical filter of the optical beam transmissive adjusting mechanism in the optical pickup device shown in FIG. 4.
Figure 6A:
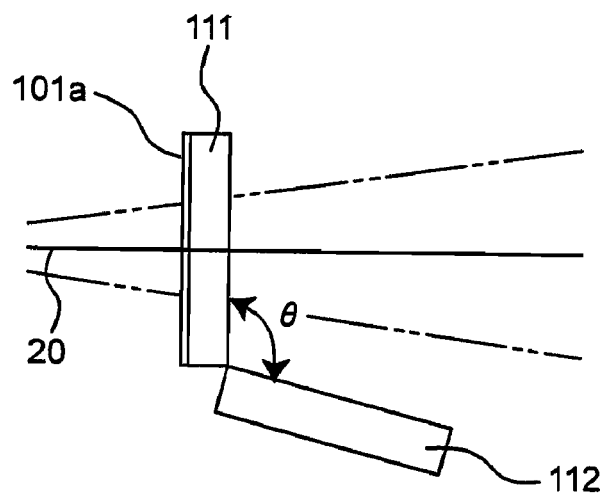
FIG. 6A is a side view obtained when the optical beam passes through an optical filter of the optical beam transmissive adjusting mechanism in the optical pickup device shown in FIG. 4.
Figure 6B:
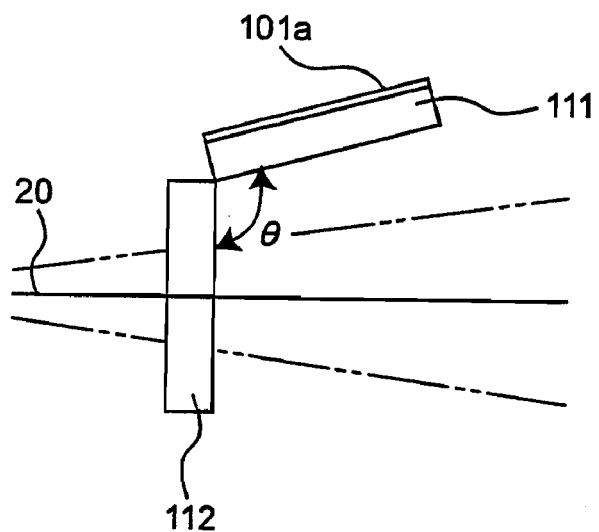
FIG. 6B is a side view obtained when the optical beam does not pass through the optical filter of the optical beam transmissive adjusting mechanism in the optical pickup device shown in FIG. 4.

FIG. 4 shows an optical disk apparatus 25 including an optical pickup device 26 according to the second embodiment. A difference between the optical disk apparatus 10 described above and the optical disk apparatus 25 is only a difference between the configuration of the optical beam transmissive adjusting mechanism 100 included in the optical pickup device 11 and a configuration of an optical beam transmissive adjusting mechanism 110 included in the optical pickup device 26. The other configurations are not changed. Therefore, the configuration in the optical beam transmissive adjusting mechanism 110 included in the optical pickup device 26 according to the second embodiment will be just described below. A difference between the optical beam transmissive adjusting mechanism 100 and the optical beam transmissive adjusting mechanism 110 is only that an angle between two transmissive elements is devised, and other configurations are not changed.

In the optical beam transmissive adjusting mechanism 100 according to the first embodiment, as shown in FIGS. 2A, 2B, and 3A, the transmissive element 101 and the transmissive element 102 are orthogonally arranged to have an angle of 90°, and the transmissive elements 101 and 102 are rotationally driven by the rotational drive unit 105 such that the optical beam 20 enters vertically on each of the transmission surfaces of the transmissive element 101 and the transmissive element 102. Also, as shown in FIG. 1, the optical beam transmissive adjusting mechanism 100 is arranged at a region where the optical beam 20 radiated from the light source 1 travels while being diffused until entering to the beam splitter 2. Thus, the optical beam 20 passing through one of the transmissive element 101 and the transmissive element 102 also travels toward the beam splitter 2 while being diffused. Therefore, the transmissive element of the non-transmissive side through which the optical beam 20 does not pass might obstruct the optical beam that passes through the transmissive element and then travels while being diffused. For example, in the case shown in FIG. 2A, the optical beam passing through the transmissive element 101 of the transmissive side might be obstructed by the transmissive element 102 of the non-transmissive side. More specifically, an end portion 102a of the transmissive element 102 of the non-transmissive side shown in FIG. 3A might obstruct the path of the optical beam passing through the transmissive element 101.

Thus, in the optical beam transmissive adjusting mechanism 110 according to the second embodiment, as shown in FIGS. 5A, 5B, 6A, and 6B, a transmissive element 111 corresponding to the transmissive element 101 and a transmissive element 112 corresponding to the transmissive element 102 are arranged such that an angle θ between the transmissive element 111 and the transmissive element 112 exceeds 90°. Like the transmissive element 101, an optical filter 101a having a transmittance of 50% is applied to a transmission surface of the transmissive element 111.

When the transmissive element 111 and the transmissive element 112 are arranged as described above, as is apparent from FIGS. 6A and 6B, the transmissive element of the non-transmissive side for the optical beam, for example, the transmissive element 112 shown in FIG. 6A, is arranged at an angle inclined to the optical axis of the optical beam 20 and inclined to a horizontal direction. Further, the transmissive element 112 is arranged in an inclined manner along the path of the optical beam which passes through the transmissive element of the transmissive side for the optical beam, for example, the transmissive element 111 shown in FIG. 6A and then travels while being diffused. Therefore, the transmissive element of the non-transmissive side for the optical beam can prevent the optical beam passing through the transmissive element and being diffused from being obstructed.

Also, the transmissive element of the non-transmissive side for the optical beam is disposed with the inclined state along the path of the optical beam, so that obstruction for the traveling of the optical beam can be eliminated. For this reason, the sizes of the transmission surfaces of the transmissive element 111 and the transmissive element 112 can be minimally required sizes to cause the optical beam to pass through the transmissive element 111 and the transmissive element 112. Therefore, the transmissive element 111 and the transmissive element 112 can be formed more compactly than the transmissive element 101 and the transmissive element 102 according to the first embodiment. Consequently, such configuration can also contribute to downsize the entire apparatus.

Furthermore, in the optical pickup device, an air flow is generated with rotation of the optical disk 14. For this reason, dust such as fibriform dust may enter into the optical pickup device. According to the second embodiment, as a countermeasure against the dust, as described above, the transmissive element of the non-transmissive side is arranged to be inclined along the path of the optical beam and to be inclined to the horizontal direction. For this reason, the dust that may adhere to the transmissive element of the non-transmissive side can be caused to slip off, and the dust can be also advantageously prevented from adhering to or being deposited on the transmissive element on the non-transmissive side for the optical beam. Therefore, the optical beam radiated from the light source 1 can always stably enter to the beam splitter 2, which contributes to operation stability of the optical pickup device.

The angle θ between the transmissive element 111 and the transmissive element 112, as described above, can be set to an angle of inclination along the path of the optical beam that passes through the transmissive element of the transmissive side for the optical beam and then travels while being diffused, or set to a larger angle than it. Alternatively, on the basis of the dustproof effect, the angle θ can also be set to an anti-adhesive angle at which the dust can be effectively prevented from adhering to or being deposited on the transmissive element of the non-transmissive side for the optical beam.

In the above description, the angle θ is set at an angle exceeding 90°. However, when it is not required to consider that the transmissive element of the non-transmissive side for the optical beam obstructs the path of the optical beam, the angle θ can also be set at 90° as in the first embodiment. When the angle θ is set to 90° as described above, the optical beam transmissive adjusting mechanism 110 can be structured to be more compact than that obtained when the angle θ exceeds 90°, and the transmissive element 111 and the transmissive element 112 can be easily arranged and manufactured advantageously.

Figure 7:
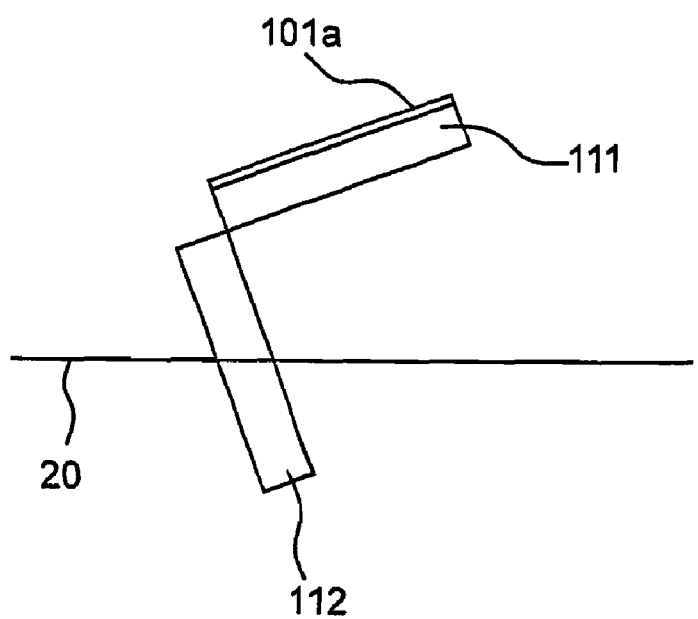
FIG. 7 is a diagram showing a case in which an angle between a transmissive element on an optical beam transmissive side and a transmissive element on an optical beam non-transmissive side is set at 90° in the optical pickup device shown in FIG. 4.

However, in order to achieve the dust-proof effect, the transmissive element of the non-transmissive side for the optical beam is arranged in the inclined manner. With the inclined arrangement, as shown in FIG. 7, the transmissive element of the transmissive side for the optical beam, i.e., the transmissive element 112 in FIG. 7 is inclined with respect to the optical axis of the optical beam 20. Thus, as described in the first embodiment, optical axis misalignment occurs in the optical beam passing through the transmissive element 112. However, the transmissive element 112 is rotationally driven by the rotational drive unit 105, and the same optical axis misalignment as that in the transmissive element 112 occurs at the transmissive element 111 even when the optical beam 20 passes through the transmissive element 111. Therefore, since amounts of misalignment in the transmissive element 111 and the transmissive element 112 are equal to each other, the optical pickup device does not pose any problem.

Figure 8:
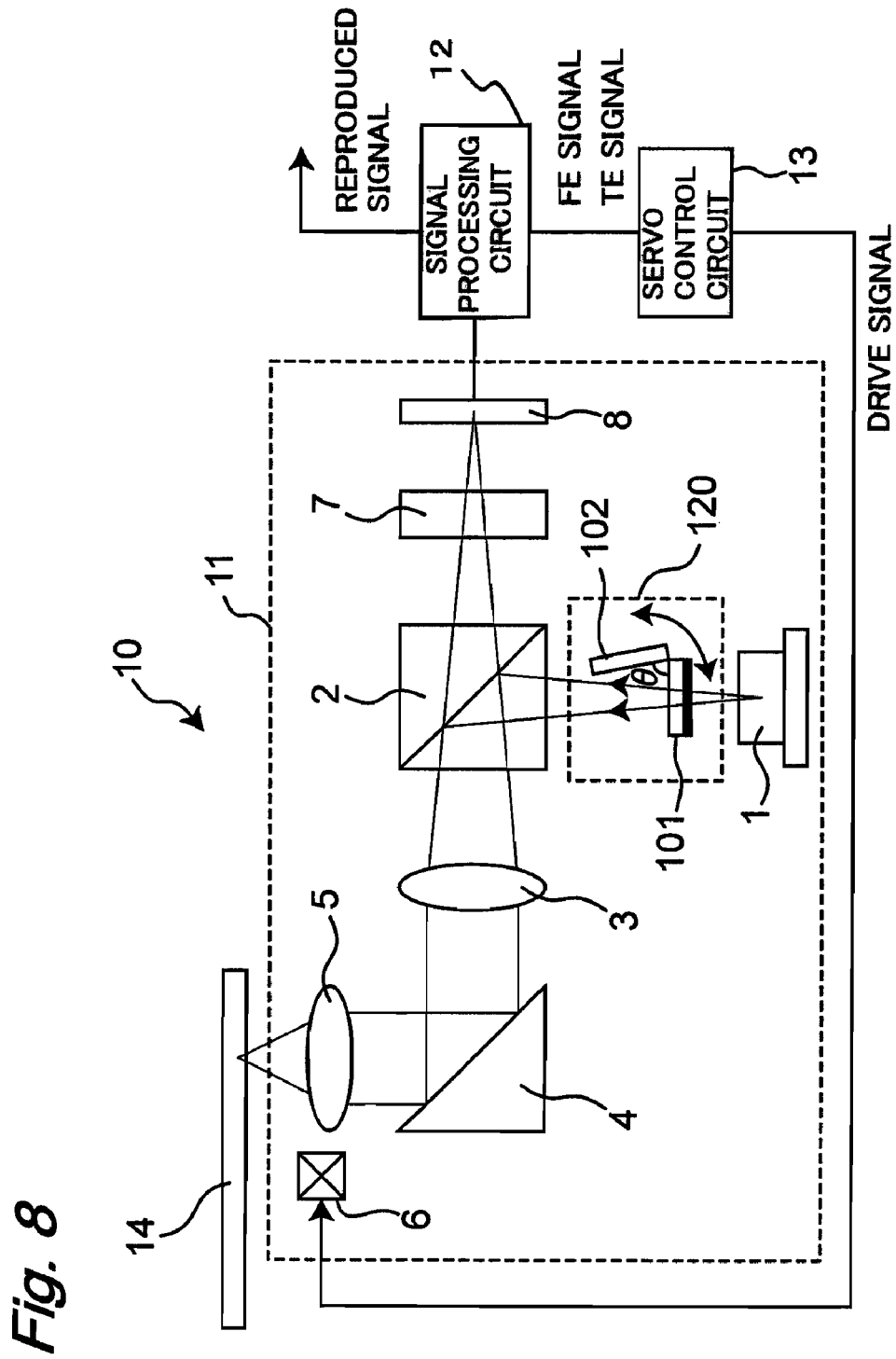
FIG. 8 is a diagram showing a configuration of functional blocks of an optical disk apparatus including a modification of the optical pickup device shown in FIG. 1.

In each of the embodiments, the angles θ between the transmissive elements 101 and 111 and the transmissive elements 102 and 112 included in the optical beam transmissive adjusting mechanisms 100 and 110 are set at a right angle or larger. However, the embodiments are not limited to these configurations. For example, as in an optical beam transmissive adjusting mechanism 120 shown in FIG. 8, the transmissive element 101 and the transmissive element 102 can be arranged at an angle smaller than 90°. With this configuration, in comparison with the case in which the transmissive element 101 and the transmissive element 102 are arranged at the angle of 90°, the optical beam transmissive adjusting mechanism can be more compactly structured. Since the optical beam that passes through one of the transmissive element 101 and the transmissive element 102 travels while being diffused, the other of the transmissive element 101 and the transmissive element 102 should be arranged at an angle such that the transmissive element, in particular an end portion thereof, does not interfere with the optical beam to be diffused. As an example, the transmissive element 101 and the transmissive element 102 can be arranged at an angle of 85°.

Figure 9:
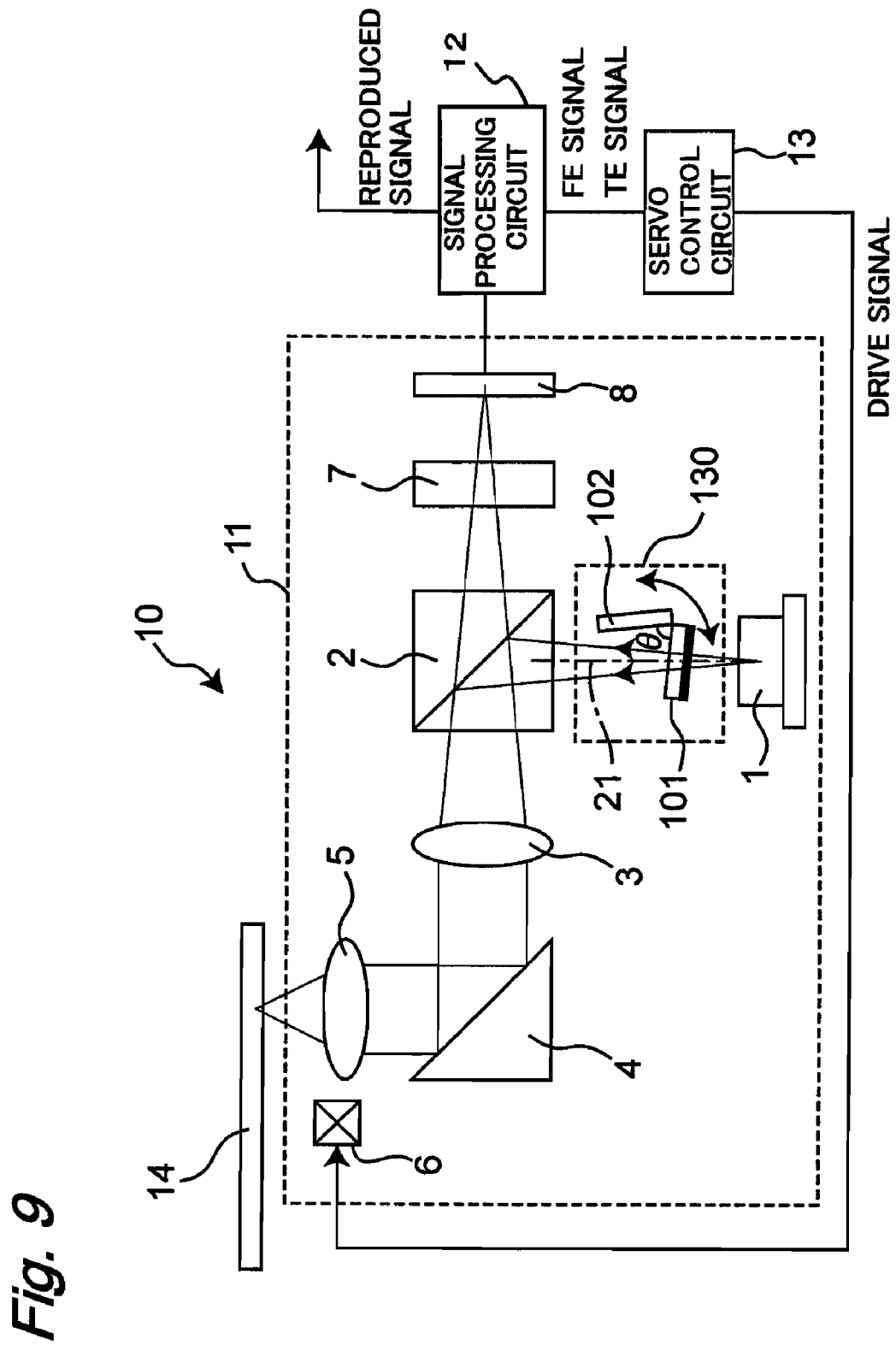
FIG. 9 is a diagram showing a configuration of functional blocks of an optical disk apparatus including another modification of the optical pickup device shown in FIG. 1.
Figure 10:
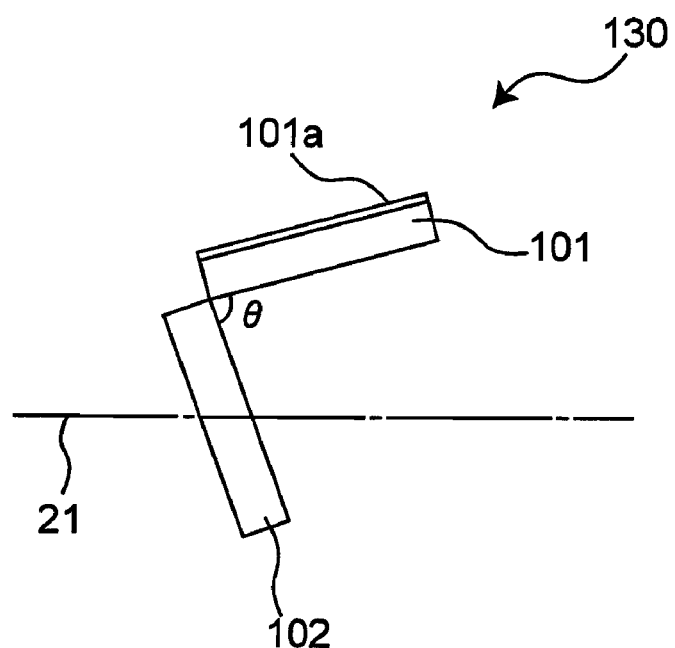
FIG. 10 is an enlarged view of a transmissive element on an optical beam transmissive side and a transmissive element on an optical beam non-transmissive side in the optical pickup device shown in FIG. 9.
Figure 11:
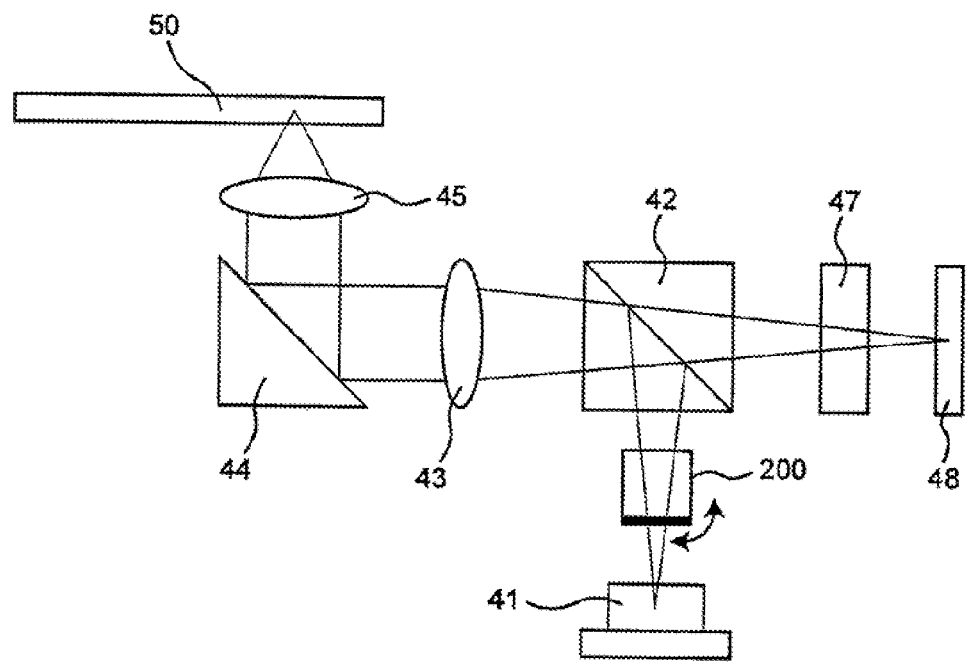
FIG. 11 is a diagram showing a configuration of a conventional optical pickup device.
Figure 12:
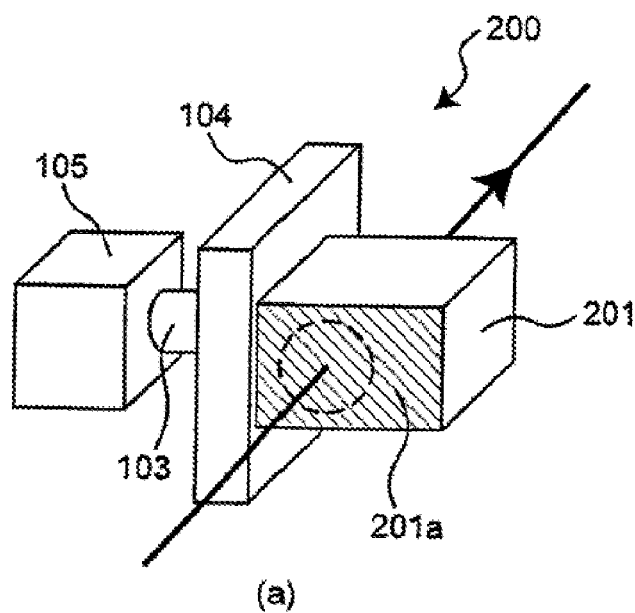
FIG. 12(a) is a perspective view obtained when an optical beam passes through an optical filter of the optical beam transmissive adjusting means.
FIG. 12(b) is a perspective view obtained when an optical beam does not transmit the optical filter of the optical beam transmissive adjusting means.
Figure 12:
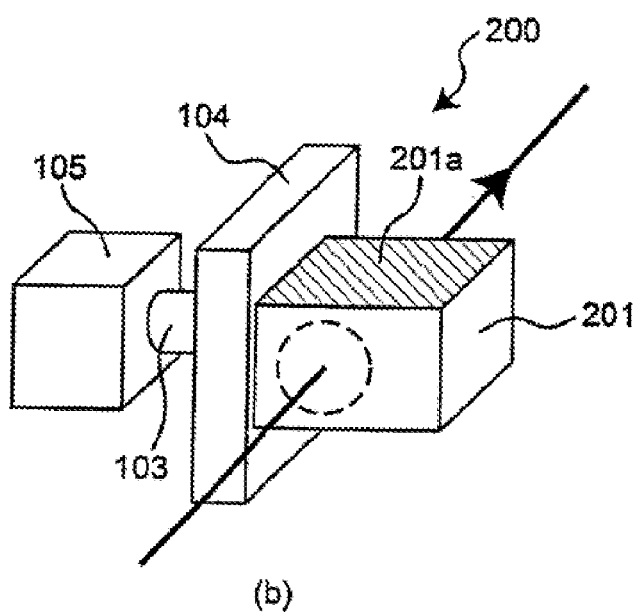
Figure 13:
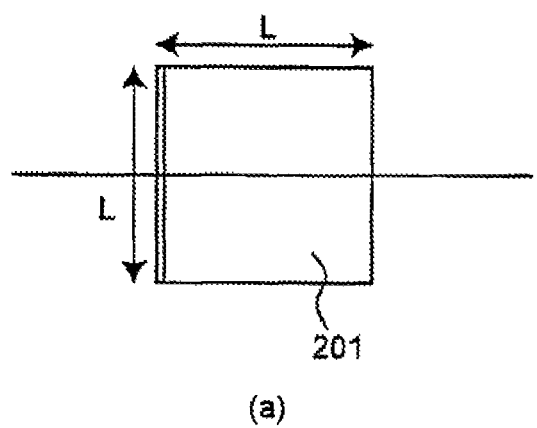
FIG. 13(a) is a diagram showing a state in which an entry angle of an optical beam to the transmissive element of the optical beam transmissive adjusting means is not misaligned.
FIG. 13(b) is a diagram showing a state of misalignment of the optical axis when entry angle misalignment of the optical beam to the transmissive element of the optical beam transmissive adjusting means is present.
Figure 13:
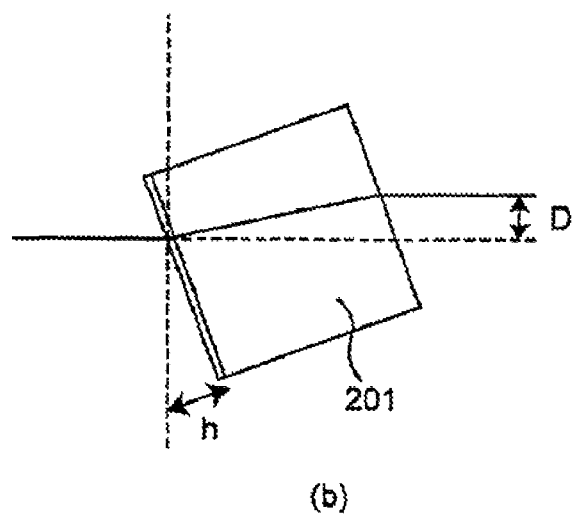

Furthermore, as in an optical beam transmissive adjusting mechanism 130 shown in FIGS. 9 and 10, the transmissive element 101 or the transmissive element 102 through which a laser beam emitted from the light source 1 passes is arranged to be inclined with respect to an optical axis 21 of the laser beam. As described above, since the plane of incidence for the laser beam of the transmissive element 101 or the transmissive element 102 is inclined with respect to the optical axis 21 of the laser beam, it makes possible to prevent a reflected light emitted from the light source 1 and reflected by the transmissive element 101 or the transmissive element 102 from being entered to the light source 1 again, and the probability of causing a trouble in generation of laser beams in the light source 1 can be reduced. According to the above arrangement, as descried above, although optical axis misalignment occurs in both the transmissive element 101 and the transmissive element 102, amounts of the optical axis misalignment occurring in the both elements are equal to each other, and no problem is posed in the optical pickup device. FIGS. 9 and 10 show a case in which the angle θ between the transmissive element 101 and the transmissive element 102 is smaller than 90°. The present invention is not limited to the configuration. Even though the angle θ is set at 90° or more, the plane of incidence for the laser beam of the first transmissive element or the second transmissive element is inclined with respect to the optical axis 21 of the laser beam to make it possible to prevent the reflected light from being entered to the light source 1.

INDUSTRIAL APPLICABILITY

According to the present invention, there can be obtained an optical pickup device which can suppress misalignment of an optical axis occurring in optical beam transmissive adjusting means to a low level and can realize improvement of apparatus reliability, decrease in production costs, and the like, and an information processing apparatus having the optical pickup device.

The invention claimed is:
1. An optical pickup device comprising:
a light source configured to emit an optical beam having a predetermined optical power;
an optical beam transmissive adjusting mechanism configured to adjust a transmission quantity of the optical beam; and a light-gathering member configured to focus the optical beam passing through the optical beam transmissive adjusting mechanism on an information recording medium, the optical beam transmissive adjusting mechanism including:
  a first transmissive element having a first transmittance;
  a second transmissive element having a second transmittance higher than the first transmittance;
  a support member configured to rotatably support the first transmissive element and the second transmissive element about a rotating shaft parallel to the first transmissive element and the second transmissive element; and
  a rotational drive unit configured to rotationally drive the first transmissive element and the second transmissive element about the rotating shaft,
  the rotational drive unit being driven to switch a first position where the optical beam passes through the first transmissive element and a second position where the optical beam passes through the second transmissive element, so that an optical beam having a first optical power smaller than the predetermined optical power and an optical beam having a second optical power larger than the first optical power and not more than the predetermined optical power being output selectively,
wherein, when the optical beam passes through one of the first transmissive element and the second transmissive element, the other of the first transmissive element and the second transmissive element is arranged at an angle inclined to an optical axis of the optical beam and corresponding to diffusion of the optical beam passing through the one of the transmissive elements.

2. The optical pickup device according to claim 1, wherein one of the first transmissive element and the second transmissive element through which the optical beam passes is inclined with respect to the optical axis of the optical beam.

3. The optical pickup device according to claim 1, wherein the angle is an anti-adhesive angle which prevents dust from adhering to the other transmissive element.

4. The optical pickup device according to claim 1, wherein a transmission distance at which the optical beam passes through the first transmissive element is shorter than a length of each of sides constituting a surface of the second transmissive element, and a transmission distance at which the optical beam passes through the second transmissive element is shorter than a length of each of sides constituting a surface of the first transmissive element.

5. The optical pickup device according to claim 1, wherein a transmission distance at which the optical beam passes through the first transmissive element or the second transmissive element is shorter than a length of a side constituting a plane of incidence of one of the transmissive elements.

6. The optical pickup device according to claim 1, wherein the light source is a semiconductor laser which emits a beam in a wavelength region from green to ultraviolet.

7. The optical pickup device according to claim 1, wherein the light source is a semiconductor laser which emits a beam in a blue wavelength region.

8. An information processing apparatus comprising:
an optical pickup device having a photodetector configured to detect a reflected light from an information recording medium; and
a signal processing circuit configured to generate at least one of a reproduced signal and a servo signal on the basis of the reflected light detected by the photodetector,
the optical pickup device further including:
  a light source configured to emit an optical beam having predetermined optical power;
  an optical beam transmissive adjusting mechanism configured to adjust a transmission quantity of the optical beam; and
  a light-gathering member configured to focus the optical beam passing through the optical beam transmissive adjusting mechanism on an information recording medium,
  the optical beam transmissive adjusting mechanism including:
    a first transmissive element having a first transmittance;
    a second transmissive element having a second transmittance higher than the first transmittance;
    a support member configured to rotatably support the first transmissive element and the second transmissive element about a rotating shaft parallel to the first transmissive element and the second transmissive element; and
    a rotational drive unit configured to rotationally drive the first transmissive element and the second transmissive element about the rotating shaft,
    the rotational drive unit being driven to switch a first position where the optical beam passes through the first transmissive element and a second position where the optical beam passes through the second transmissive element, so that an optical beam having a first optical power smaller than the predetermined optical power and an optical beam having a second optical power larger than the first optical power and not more than the predetermined optical power being output selectively,
  wherein, when the optical beam passes through one of the first transmissive element and the second transmissive element, the other of the first transmissive element and the second transmissive element is arranged at an angle inclined to the optical axis of the optical beam and corresponding to diffusion of the optical beam passing through the one of the transmissive elements.

9. The information processing apparatus according to claim 8, wherein information recording media of a plurality of types having different numbers of recording layers can be loaded, and optical beams having magnitudes of optical power depending on the numbers of recording layers are radiated to the loaded information recording media to read and/or write data,
  when an information recording medium having one recording layer is loaded, the rotational drive unit is driven to switch the position to the first position and radiate an optical beam having the first optical power to the recording layer, and
  when an information recording medium having a plurality of recording layers is loaded, the position is switched to the second position by driving the rotational driving unit to radiate an optical beam having the second optical power to one of the recording layers.

* * * * *